Jan. 3, 1939.                    W. J. ALBERSHEIM                    2,142,297
                                  OPTICAL SYSTEM
                              Original Filed June 4, 1936
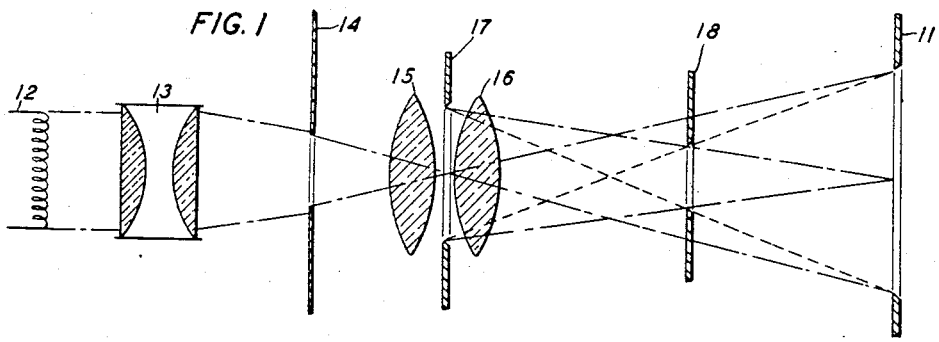
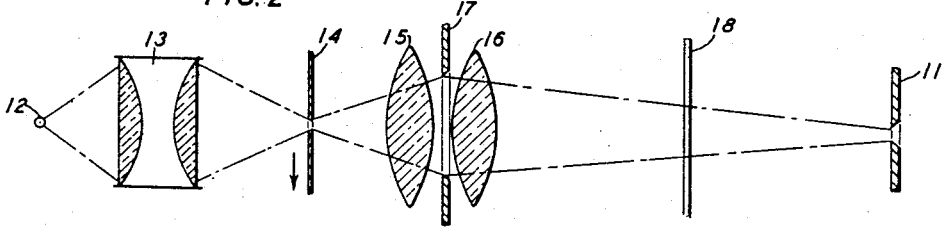
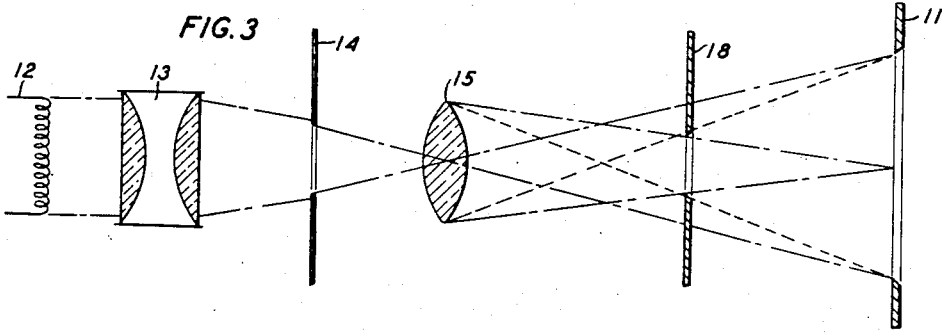
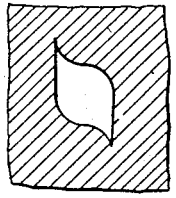    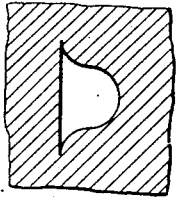    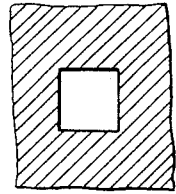
FIG. 4          FIG. 5          FIG. 6
INVENTOR
W. J. ALBERSHEIM
BY  G. H. Heydt.
ATTORNEY Patented Jan. 3, 1939

2,142,297

UNITED STATES PATENT OFFICE 2,142,297

OPTICAL SYSTEM

Walter J. Albersheim, New York, N. Y., assignor to Electrical Research Products, Inc., New York, N. Y., a corporation of Delaware Original application June 4, 1936, Serial No. 83,514. Divided and this application June 9, 1937, Serial No. 147,214

3 Claims. (Cl. 88—24)

This application is a division of my copending application Serial No. 83,514 filed June 4, 1936.

This invention relates to an optical system and particularly to an optical system for reproducing a sound record impressed upon a photographic film.

The object of the invention is an optical system which when illuminated by a source of light of constant intensity will produce a narrow band of light in which the intensity at the center of the band is a maximum and decreases uniformly outward from the center of the band.

A feature of the invention is an optical stop placed in front of the image formed by the optical system to modify the intensity of the image.

In the drawing:

Fig. 1 is a plan view of the invention embodied in a film sound reproducing system and having two sets of stops in the optical system;

Fig. 2 is an elevation of the system shown in Fig. 1;

Fig. 3 is a plan view of a reproducing system embodying the invention and having only one stop in the optical system; and Figs. 4, 5 and 6 show alternative forms of the stop shown in Figs. 1, 2 and 3.

In Figs. 1 and 2 light from the filament 12 of a scanning lamp is focussed by the condensing lens system 13 on a film sound record 14. An image of the illuminated width of the sound record 14 is formed by the lenses 15, 16 in the plane of the rear scanning slit 11. The rear scanning slit 11 may form a part of a conventional film sound reproducing system. An opaque plate 17 having a rectangular aperture forms a stop for the lens 15, 16. A second opaque plate 18 pierced with an aperture, or a pair of plates, is interposed in the beam between the lenses 15, 16 and the plane of the image. The edges of the aperture in the plate 18 are located at the intersection of the lines from the center of the image to the edges of the lens stop and from the ends of the image to the opposite edges of the lens stop. Under these conditions, the intensity of the light at the center of the image formed in the slit 11 will be a maximum and will decrease uniformly to zero at both ends of the slit 11. This result may be checked by imagining the eye to be placed at the upper end of the slit 11. The upper edge of the stop 18 will then be in line with the lower edge of the stop 17 and no light will reach the eye. Thus, the intensity of the image will be zero. Now, if the eye be moved a short distance nearer to the center of the image in the slit 11, a small part of the illuminated portion of the lens 16 will be seen and the intensity of the image at this point will have some small value. As the eye is moved progressively nearer the center of the split 11, the intensity of the light will progressively increase until at the center of the slit 11, the whole area of the aperture in the stop 17 contributes light to the image and the intensity of the light forming the image will be a maximum.

If the stop 18 is moved from the position shown in the drawing nearer to the image plane in the slit 11, the upper edge of the stop 18 will prevent any light from reaching a portion of the upper part of the slit 11. Thus, in this case, the intensity of the light forming the image will be a maximum for a short distance at the center of the slit 11, and will decrease uniformly to zero at a point in the upper part of the slit 11 and will be zero from that point to the end of the slit 11. The light forming the image will vary similarly in the lower part of the slit 11.

If the stop 18 is moved nearer to the lens 16, the intensity of the light forming the image will be a maximum at the center of the slit 11 (but will be less in absolute magnitude than in the cases discussed hereinabove) and will decrease uniformly to the ends of the slit 11, but will not decrease to zero at the ends.

In Figs. 1, 2 and 3 similarly numbered elements have similar functions. In Fig. 3 the single unstopped lens 15 replaces the stop lens system 15, 16, 17 of Figs. 1 and 2. In the case shown in Fig. 3, the line defining the location of the aperture in the plate 18 runs from the center and ends of the image formed in the slit 11 to the two edges of the lens 15.

As described in connection with Figs. 1 and 2, the interposition of the stop 18 will cause the intensity of illumination of the image formed in the plane of the slit 11 to vary from a maximum at the center of the slit to a minimum at each end.

It is not essential that the intensity of the image formed in the plane of the rear scanning slit 11 should vary uniformly outward from the center of the slit. The intensity of the image at two points equidistant from the center should be equal, thus producing a condition which may be termed reverse symmetry. And, considering only one-half of the image, the intensities of the image at any two points equidistant from the center line of the half image (the quarter lines of the whole image) should together equal a constant, thus producing a condition which may be termed inverse symmetry.

The stop 18 may be formed of two parallel plates or of a rectangular aperture in a single plate, as shown in Fig. 6. The aperture may also be formed as shown in Figs. 4 and 5, in which the radii of all the curves are one-half of the distance between the intersections of the line shown in Figs. 1 and 3. While the invention has been shown as embodied in a film sound reproducing system using a rear scanning slit, it will be evident that many variations may be made within the scope of the invention. For example, the stop 18 may be located between the lens 13 and the image of the filament formed on the film 14 and thus cause the intensity of the light impressed on the film 14 to vary in a manner similar to the variation in the intensity of the light forming the image in the plane of the rear scanning slit 11.

What is claimed is:

1. In an optical system, an illuminated object, a lens system for forming an image of said object, and means comprising an optical stop to cause the intensity of said image to vary in reverse symmetry from the center to both ends and to cause the intensity of each half of said image to vary in inverse symmetry with respect to the intensity of the center of the half image.

2. In an optical system, a uniformly illuminated object, a lens system for forming an image of said object, and means comprising an optical stop located between the lens and the image plane to cause the intensity of said image to vary in reverse symmetry from the center to both ends of said image and to cause the intensity of each half of said image to vary in inverse symmetry with respect to the intensity of the center of the half image.

3. In an optical system, a uniformly illuminated rectangular object, a lens system for forming an image of said object, and means comprising an optical stop located between said lens and the image plane to cause the intensity of said image in one direction to be substantially constant and to cause the intensity of said image in a direction normal to said first direction to vary symmetrically from the center to both ends of said image.

WALTER J. ALBERSHEIM.